Oct. 28, 1958     J. O. BENSON     2,858,218
CEREAL PRODUCT WITH RASPBERRY-LIKE APPEARANCE
AND METHOD OF MAKING SAME
Filed Feb. 16, 1955
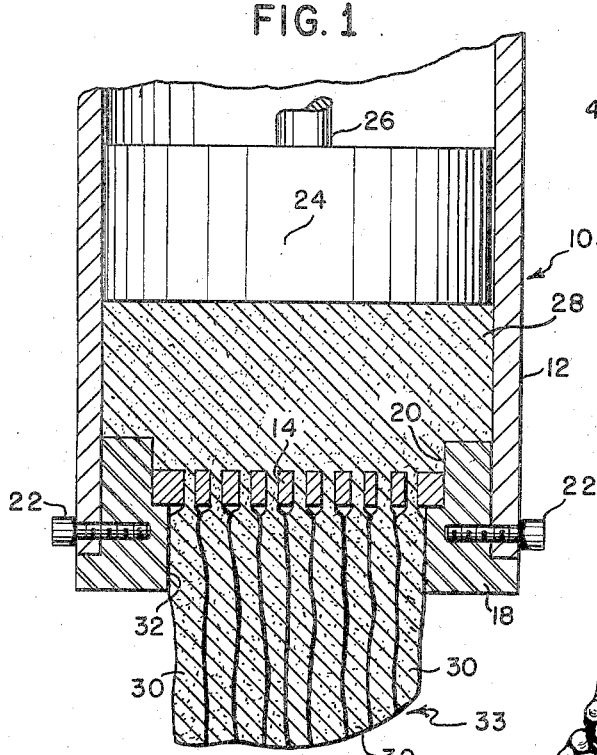
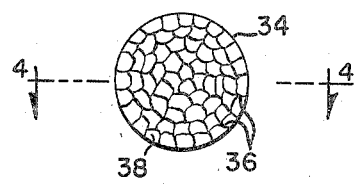
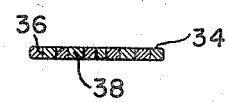
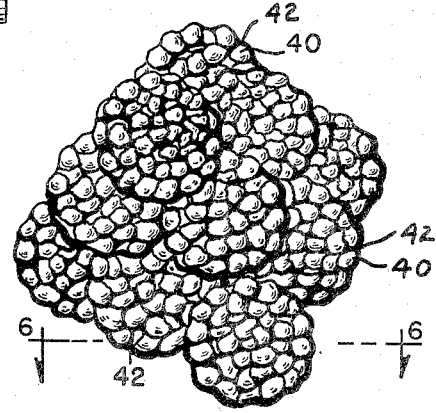
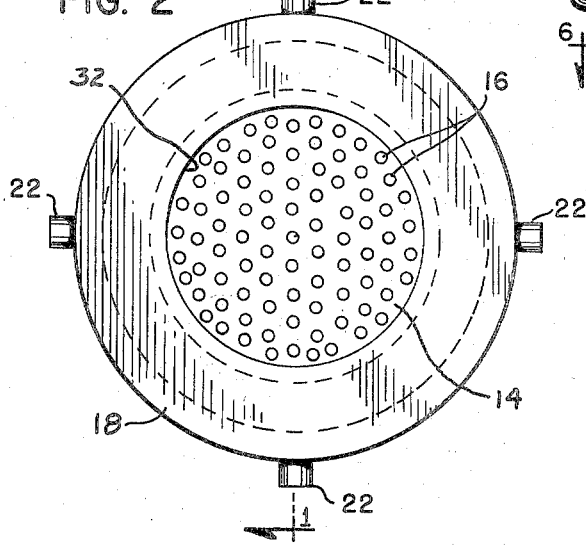
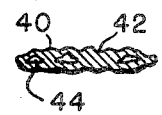
INVENTOR.
JOHN O. BENSON
BY Stuart R. Peterson
ATTORNEY

2,858,218

CEREAL PRODUCT WITH RASPBERRY-LIKE APPEARANCE AND METHOD OF MAKING SAME

John O. Benson, Mayer, Minn., assignor to General Mills, Inc., a corporation of Delaware Application February 16, 1955, Serial No. 488,484

7 Claims. (Cl. 99—81)

The present invention relates to a cereal product of the ready-to-eat variety and also pertains to a process of producing such cereal product.

The principal object of the instant invention is to produce a cereal flake having a distinctly attractive appearance. In this regard it is an aim of the invention to provide a flake having a multiplicity of bulges or small mounds distributed over its opposite faces so that the flake has a surface simulating that of a raspberry. Further, it is within the purview of the invention to add to the dough a suitable dye so that the desired fruit effect will be even more realistic.

Another object of the invention which is a concomitant result of the foregoing object resides in the provision of a cereal flake that has a texture which has proved to be extremely appetizing, due largely to the many fracture points involved in the creation of the raspberry effect.

A still further object of the invention is to provide a method for making the type of cereal described above, which method will be relatively inexpensive and which will lend itself readily to mass production requirements.

Other objects will be in part obvious, and in part pointed out more in detail hereinafter.

The invention accordingly consists in the features of the cereal construction and the method by which the cereal is produced, both of which will be exemplified in the construction hereafter set forth and the scope of the application will be indicated in the appended claims.

In the drawing, Figure 1 is an elevational view in section of certain extrusion apparatus, somewhat enlarged, taken in the direction of line 1—1 of Fig. 2, which apparatus is utilized in the performing of a preferred method for producing my cereal product.

Fig. 2 is a bottom view corresponding to Fig. 1.

Fig. 3 is a plan view of a single cereal flake or dough wafer before puffing.

Fig. 4 is a sectional view taken in the direction of line 4—4 of Fig. 3.

Fig. 5 is a plan view showing a group of cereal flakes after puffing; and

Fig. 6 is a sectional view taken in the direction of line 6—6 of Fig. 5 so as to show the internal structure of one of the puffed cereal flakes.

Describing first the apparatus with which the invention may be practiced, reference should be had to Figs. 1 and 2 of the drawing where the extrusion apparatus designated generally by the reference numeral 10 includes a cylindrical shell or casing 12 and an orifice plate 14. The orifice plate 14 is provided with numerous apertures 16 for the purpose of forming dough filaments as will later be explained. The orifice plate 14 is maintained in operative juxtaposition relative to the cylinder 12 by means of a retaining ring 18, the retaining ring being recessed at 20 for the accommodation of the orifice plate 14. Holding the retaining plate 18 in place relative to the cylinder 12 is a plurality of screws 22.

Also incorporated into the extrusion apparatus is a piston 24 having attached thereto a piston rod 26 which may be suitably connected to actuating mechanism not shown. The function of the piston 24 is to force cooked dough 28 downwardly through the orifice plate 14 so that by reason of the numerous apertures 16 the dough is extruded through the plate 14 and emerges in the form of a number of filaments or strands 30.

As can be seen from an inspection of Fig. 1, the apertures 16 are of relatively small diameter, and after passing through these apertures, the dough filaments 30 are permitted to expand to the size pictured beneath the plate 14 but constrained to a certain extent by the retaining ring 18 since the bore of this ring, which has been given the numeral 32, is of limited dimensions. In this way the filaments 30 are relatively gently urged into a contiguous or partially fused relationship and do not completely lose their identity.

After the filaments 30 leave the extrusion apparatus 10, they literally constitute a unitary cylinder 33, and this cylinder is dried sufficiently so that it may be sliced into relatively thin wafers. One of these relatively thin wafers has been indicated by the reference numeral 34 and may be viewed in Fig. 4. As seen from this particular figure, longitudinal portions of the filaments or strands 30 are preserved, even after cutting, as evidenced by lines of demarcation designated by the numeral 36 extending completely through the wafer. It is these lines 36, or more exactly the short filament portions, that form what might be termed short columns of dough, these columns having the reference numeral 38. The top surface of the columns 38 can be seen in Fig. 3, and from this figure it will be noted that each column is quite irregular in a perimetrical direction. The reason for the irregularity stems from the fact that upon emergence of the filaments 30 from the lower ends of the apertures 16, the expansion of the dough is uneven and the filaments 30 therefore vary in cross section both with respect to each other and throughout the length of any particular filament. This irregularity of the upper and lower faces of the column 38 is, however, desirable, and as will hereinafter be made more manifest, results in the raspberry-like surface with which the invention is primarily concerned.

After slicing the cylinder 33 into the wafers 34, the wafers are subjected to sufficient radiant heat or other puffing action whereby they are puffed so that each column bulges at its ends to present an over-all bumpy surface, which surface simulates that of a raspberry. These bumps or bulges, labelled 40 in Figs. 5 and 6, are actually what may be described as small islands separated from each other by intervening grooves or valleys 42. Consequently it is believed obvious that the cumulative appearance created by the bulges or mounds 40 and the intervening grooves 42 presents the sought-after raspberry-like appearance. Stated somewhat differently, the grooves or valleys 42 in effect form a latticework or network which leaves the individual bulges 40 therebetween.

Also, from Fig. 6 it is to be recognized that the texture of the flake is enhanced by reason of the vesicular internal structure of the flake, this structure resulting in the production of a plurality of small voids or spaces 44. Further, since the flake is weakened at various points throughout, due both to the formation of the bulges 40 and the voids 44, many fracture locations are produced and the friability of the flake is thus increased. As a result, the flake has not only a decidedly unique surface appearance but it is extremely pleasant to eat because of the many fracture points present in the finished flake product.

The invention is applicable to cooked cereal doughs in general including doughs derived from wheat, corn, oats, barley, rye and the like. The doughs may be derived from a single grain or from mixtures thereof and the invention particularly contemplates doughs derived from a grain together with some starch added for the purpose of improving the puffability of the product. These doughs may be cooked in any conventional manner. Collatz Patent 2,162,376 illustrates a convenient way in which the cooking of the dough may be carried out. While the invention is applicable to cooked doughs in general it will be described with particular reference to a wheat dough. For the purpose of illustrating the invention it will be appreciated that with other doughs adjustments may be desirable in the moisture content and in the relative proportions of the ingredients of the doughs. These variations, however, can readily be arrived at from a consideration of the following example and from a consideration of the objects to be achieved.

*Example*

A dough was prepared from the following ingredients:

| | |
|---|---|
| Michigan white wheat (ground in a hammermill equipped with 0.185 inch diameter round hole screen) grams | 570 |
| Yellow corn cones do | 570 |
| Sucrose do | 125 |
| Salt do | 25 |
| Water cc | 900 |
| F. D. & C. Red #2 dye grams | 2.25 |

The dough was cooked in a small Baker-Perkins double arm jacketed mixer at approximately atmospheric pressure at a temperature of 212° F. for approximately 2 hours with reflux, 20 minutes with vent open and 28 minutes with top removed. The cooked dough had a moisture content of approximately 25% and was quite suitable for extrusion in the device illustrated in the drawing.

The dough was extruded through the orifice plate 14 and had suitable plasticity to expand after extrusion to form a unitary cylinder 33 without destroying the individuality of the filaments. The cylinder was dried to approximately 8–10% moisture and then sliced in the form of wafers 34. The wafers were then puffed at about 8–10% moisture in a radiant puffing oven to yield the product described previously.

In this particular example the diameter of the orifice plate 14 was approximately 5/8 of an inch and had 55 1/32 inch drilled apertures through which the dough was extruded. The bore 32 was approximately 13/16 of an inch in length and slightly smaller in diameter than the diameter of the orifice plate 14. The wafers 34 were cut to approximately 0.040 inch thickness. Under the conditions described above it was found that these various factors were correlated to give the dough the desired characteristics for ease of processing including ease of extrusion and the desired degree of coalescence of the filaments as well as the ability of the wafers to be cut without destruction of the identity of the individual filaments. It will be appreciated that with other doughs and with other dimensions for the extrusion apparatus variations may be desirable in other conditions so as to attain the desired results. From the above specific description, however, these variations can be arrived at without difficulty.

Also, it is to be stressed that the exemplified procedure and its associated apparatus are concerned with what may be termed small scale operations. In large scale or mass production situations, provision would be made for the facile introduction of the dough material 28 into the extrusion cylinder 12 by mechanical means, and the dough cylinder 33, as it emerges from the retaining ring 18, would be subjected immediately to the slicing action of a conventional rotating knife without the employment of a drying step, the moisture content of the dough material itself being appropriately adjusted, where necessary, before extrusion for such as accelerated technique.

Accordingly, it will be recognized that the foregoing description is furnished by way of illustration and not of limitation, and it is therefore my intention that the invention be limited only by the appended claims or their equivalents wherein I have endeavored to claim broadly all inherent novelty.

What is claimed:

1. A method of preparing cereal flakes comprising the steps of extruding a dough material into a bundle of strands, exerting pressure laterally against said bundle to cause said strands to cohere while maintaining their individual identities, slicing said bundle transversely into relatively thin wafers, and heating said wafers sufficiently to cause facial portions thereof to bulge outwardly, thereby producing flakes having a raspberry-like appearance.

2. A method of preparing cereal flakes comprising the steps of extruding a dough material to produce a plurality of filaments, at least partially coalescing said filaments together with sufficient pressure to form a stranded strip of said filaments, slicing said strip transversely into relatively thin wafers, and puffing said wafers to cause facial portions thereof to bulge outwardly, thereby producing flakes having a raspberry-like appearance.

3. A method of preparing cereal flakes comprising the steps of producing a dough having sufficient moisture content therein for extrusion, extruding the dough to produce a plurality of filaments, confining longitudinal portions of said filaments after extrusion to such an extent that said filaments will be at least partially coalesced, drying said filaments sufficiently to permit slicing of the filaments transversely into relatively thin wafers without substantial loss of filamentary identity, slicing said filaments into said wafers, and puffing the wafers to cause facial portions thereof to bulge outwardly, thereby producing flakes having a raspberry-like appearance.

4. Process according to claim 2 in which the dough is colored a raspberry-like tint.

5. A cereal product in the form of a relatively thin flake, said flake comprising short segments of extruded dough filaments, said filament segments being situated in a side by side relationship and adhered to each other along their sides with the end faces of said segments lying generally in a plane to form said flake, the end faces of said segments being puffed outwardly as compared with the areas defining the contact between segments to give the flaked product a raspberry-like appearance.

6. A method of preparing cereal flakes comprising the steps of extruding a dough material to produce a plurality of filaments, at least partially coalescing said filaments together with sufficient pressure to form a stranded strip of said filaments, slicing said strip transversely into relatively thin wafers, and puffing said wafers to cause facial portions of said filaments to bulge outwardly as compared with the areas defining the points of contact between the filaments.

7. A cereal product in the form of a relatively thin flake, said flake comprising short segments of extruded dough filaments, said filament segments being situated in a side by side relationship and adhered to each other along their sides with the end faces of said segments lying generally in a plane to form said flake, the end faces of said segments being puffed outwardly as compared with the areas defining the contact between segments.

References Cited in the file of this patent

UNITED STATES PATENTS

| 1,832,813 | Luke | Nov. 17, 1931 |
| 1,890,697 | Scanlan | Dec. 13, 1932 |
| 1,945,946 | McKay | Feb. 6, 1934 |
| 2,338,588 | Kishlar et al. | Jan. 4, 1944 |
| 2,428,665 | Harrel et al. | Oct. 7, 1947 |